E. MEIER.
WIND SHIELD.
APPLICATION FILED MAR. 21, 1911.

1,002,071.

Patented Aug. 29, 1911.

2 SHEETS—SHEET 1.

WITNESSES:
G. Robert Thomas
T. J. Gallagher

INVENTOR
Earnest Meier
BY Munn & Co.
ATTORNEYS

E. MEIER.
WIND SHIELD.
APPLICATION FILED MAR. 21, 1911.
1,002,071.
Patented Aug. 29, 1911.
2 SHEETS—SHEET 2.
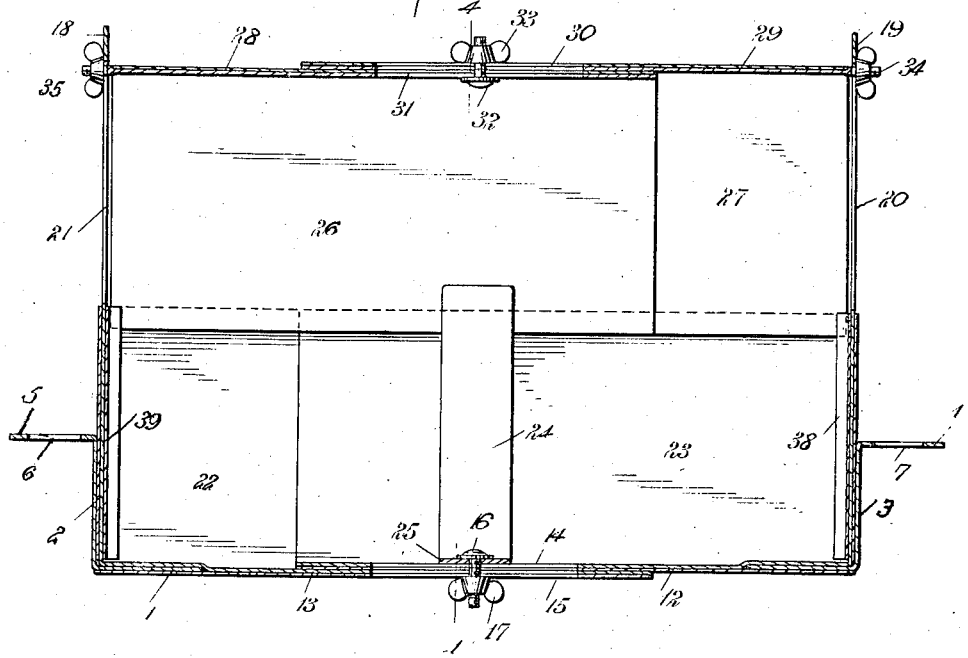

UNITED STATES PATENT OFFICE.

EARNEST MEIER, OF LA CROSSE, WISCONSIN.

WIND-SHIELD.

1,002,071.  Specification of Letters Patent.  Patented Aug. 29, 1911.

Application filed March 21, 1911. Serial No. 615,905.

*To all whom it may concern:*

Be it known that I, EARNEST MEIER, a citizen of the United States, and a resident of La Crosse, in the county of La Crosse and State of Wisconsin, have invented a new and Improved Wind-Shield, of which the following is a full, clear, and exact description.

My invention relates generally to wind shields for use on automobiles, and more particularly it relates to an adjustable shield which is especially adapted to protect the radiator of the machine from the wind while the machine is in use, thereby tending to prevent the water in the said radiator freezing.

The object of my invention is to provide a simple shield of the class described made up of a number of interfitting parts which may be easily adjusted relatively to each other, whereby the shield may be adapted to different automobiles.

Reference is to be had to the accompanying drawings forming a part of this specification, in which similar characters of reference denote corresponding parts in all the views, and in which—

Figure 1:
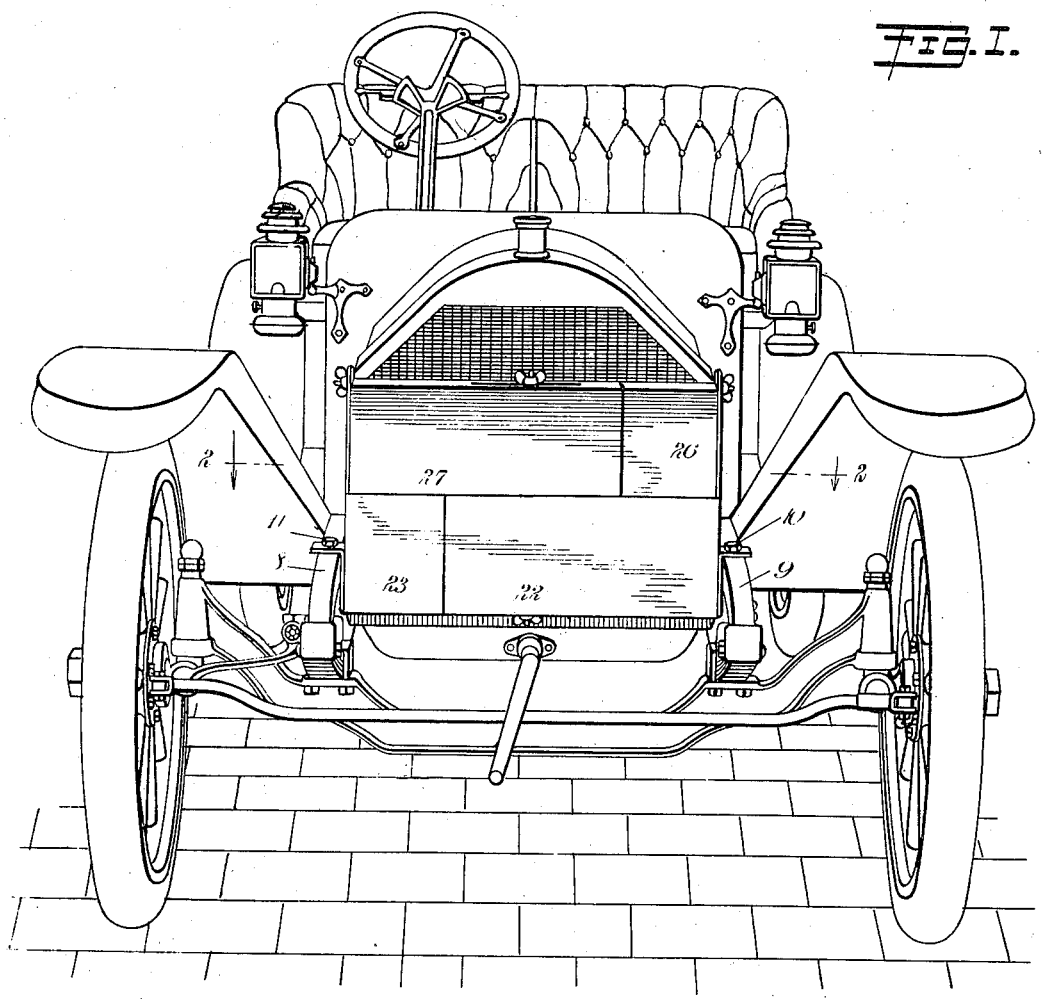
Figure 2:
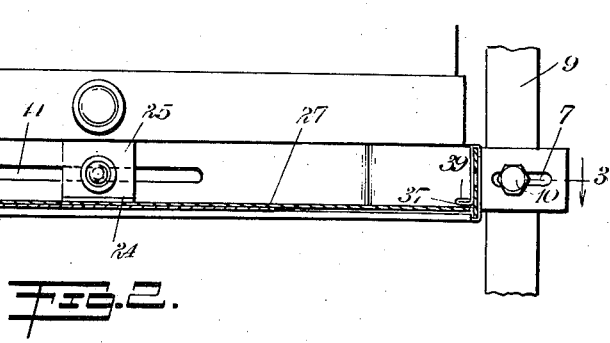

Figure 1 is a front view of an automobile fitted with my wind shield; Fig. 2 is a sectional view thereof, on the line 2—2 of Fig. 1; Fig. 3 is a vertical sectional view thereof, on the line 3—3 of Fig. 2; Fig. 4 is a vertical sectional view, on the line 4—4 of Fig. 3.

My device is made up of the lower supporting frame member 1 having up-turned end portions 2, 3, the end portions 4, 5, of the supporting frame being offset horizontally and each provided with an opening 6, 7, adapted to engage the main frame members 8, 9, of an automobile, by means of nuts or bolts 10, 11, whereby the device may be held in position in front of the radiator, as shown in Fig. 1. This supporting member 1 is made up of two substantially similar parts 12, 13, each provided with a longitudinally extended opening 14, 15, through which a bolt 16, provided with a winged nut 17, is adapted to pass, thereby providing for extension of this supporting member in order to adapt it to different sized machines.

Extending vertically from each end of the supporting member 1 and adjacent the end portions 2, 3, thereof are the uprights 18, 19, each provided with a longitudinal slot 20, 21, and each of these uprights having a shield portion 22, 23, carried thereby, and each being also connected to the end portions of the supporting member 1, one of the shield portions, however, being slightly offset relatively to the other, whereby as the bolt 16 and nut 17 are loosened these two portions may slide relatively to each other and be fixed in different positions, the centrally extending member 24 with the angularly extending end 25 being held in position on the supporting member 1 by means of this bolt and nut engaging therethrough, the purpose of the member 24 being to hold the four shield portions 22, 23, previously mentioned, and 26, 27, in engagement at approximately a central portion of the shield whereby the passage of wind through the shield and against the radiator is prevented.

The upper portion of the shield is made up of the two shield portions 26, 27, each provided with the overturned end portion 28, 29, and each being further provided with a longitudinally extending slot 30, 31, these two portions being movable relatively to each other the same as the portions 22, 23, whereby the size of the shield is varied. In order to securely hold the portions 26, 27, relatively to each other, a bolt 32 and winged nut 33 are provided, the bolt passing through the slots 30, 31. The construction thus far set forth provides for a wind shield, the size of which may be varied longitudinally; in order to provide a shield which shall also be adjustable vertically, I have provided the opposite ends of the portions 26, 27, with extending bolts 34, 35, passing through the slots 20, 21, the bolts 34, 35 being movable up and down within these openings and parts of the shield portions 26, 27, adjacent opposite ends, being included within channels 36, 37, formed by bending the inner end of the members 38 and 39, as shown in Figs. 2 and 3.

From the description above set forth, it will be seen that I have provided a novel wind shield which is especially adapted to be attached to the under frame of the automobile adjacent its front end and in front of the radiator, thereby tending to prevent the water therein from freezing by shielding the radiator from the cold blasts while the machine is in use.

It is also apparent that while I have shown my shield made up of four portions movable relatively to each other, whereby the size of the shield as a whole may be varied, that different numbers of portions may be used, thereby adapting it for use on larger or smaller cars, without departing from the spirit of the invention as set forth in the following claim.

Having thus described my invention, I claim as new, and desire to secure by Letters Patent:—

A device of the class described, comprising a supporting member made up of two parts movable longitudinally with relation to each other, a longitudinally extending slot in each part, means engaging the parts and contained within the slots for holding the parts in fixed position, a shield carried by each part, uprights carried by the said supporting member, the said uprights being each provided with a slot, a horizontally extending member made up of two parts movable relatively to each other, each part having a threaded end portion engaging in one of the said slots in the uprights and each provided with a shield, means engaging each of the last-named parts whereby they may be held in fixed relation, all of the said shields being movable relatively to one another whereby the size of the shield as a whole may be varied, the said supporting member being provided with end portions adapted to engage the frame of an automobile whereby the shield may be supported adjacent the radiator thereof.

In testimony whereof I have signed my name to this specification in the presence of two subscribing witnesses.

EARNEST MEIER.

Witnesses:
C. W. HUNT,
E. G. LANN.